United States Patent
Krummel

(10) Patent No.: US 12,303,844 B2
(45) Date of Patent: *May 20, 2025

(54) BAND-PASS FILTER

(71) Applicant: SYNERGETIC OIL TOOLS, INC., Calgary (CA)

(72) Inventor: Amber T. Krummel, Fort Collins, CO (US)

(73) Assignee: SYNERGETIC OIL TOOLS, INC., Calgary (CA)

(*) Notice: Subject to any disclaimer, the term of this patent is extended or adjusted under 35 U.S.C. 154(b) by 64 days.

This patent is subject to a terminal disclaimer.

(21) Appl. No.: 16/317,490

(22) PCT Filed: Jul. 13, 2017

(86) PCT No.: PCT/US2017/041944
§ 371 (c)(1),
(2) Date: Jan. 11, 2019

(87) PCT Pub. No.: WO2018/013817
PCT Pub. Date: Jan. 18, 2018

(65) Prior Publication Data
US 2019/0224586 A1    Jul. 25, 2019

Related U.S. Application Data

(60) Provisional application No. 62/361,654, filed on Jul. 13, 2016, provisional application No. 62/367,430, filed on Jul. 27, 2016.

(51) Int. Cl.
*B01D 9/00* (2006.01)
*B01J 19/12* (2006.01)
(Continued)

(52) U.S. Cl.
CPC ............ *B01D 9/0063* (2013.01); *B01D 9/00* (2013.01); *B01D 9/0068* (2013.01);
(Continued)

(58) Field of Classification Search
CPC ...... B01D 9/0063; B01D 9/00; B01D 9/0068; B01D 9/0081; B01D 9/005; B01D 9/0077;
(Continued)

(56) References Cited

U.S. PATENT DOCUMENTS 5,052,491 A    10/1991 Harms et al.
5,274,606 A    12/1993 Drumheller et al.
(Continued)

FOREIGN PATENT DOCUMENTS

CA    896407    5/1962
GB    2496092    5/2013
(Continued)

OTHER PUBLICATIONS

Allen, "Introduction to Molecular Dynamics Simulation," NIC Series, vol. 23, 2004, ISBN 3-00-012641, pp. 1-27.
(Continued)

*Primary Examiner* — Xiuyu Tai
(74) *Attorney, Agent, or Firm* — McNees Wallace & Nurick LLC

(57) ABSTRACT

Band-pass filters for guiding or controlling crystal polymorphism in oil are provided. Band-pass filters convert a passive energy source to a spectral energy pattern tuned to be resonant with different types of molecular oscillations pertinent to oil. Tuned energy patterns convert problematic insoluble crystals to more thermodynamically stable and soluble crystals. Methods include use of the band-pass filter in crude oil recovery and design of band-pass filter parameters for optimal use on a particular oil recovery facility.

(Continued)

Band-pass filters also lower the interfacial tension of oil when present with water, which are also provided, as are methods for enhanced recovery of oil from depleted oil fields.

9 Claims, 14 Drawing Sheets

(51) Int. Cl.
  *E21B 37/06* (2006.01)
  *F16L 53/34* (2018.01)
  *F17D 1/18* (2006.01)

(52) U.S. Cl.
  CPC .......... *B01D 9/0081* (2013.01); *B01J 19/128* (2013.01); *E21B 37/06* (2013.01); *B01J 2219/12* (2013.01); *F16L 53/34* (2018.01); *F17D 1/18* (2013.01)

(58) Field of Classification Search
  CPC ..... B01J 19/128; B01J 2219/12; E21B 37/06; F16L 53/34; F17D 1/18; C01D 3/24; C30B 7/00; C30B 29/58; C12N 13/00; C01B 5/00; C01B 13/0214; G01N 21/65; G01N 2021/656; C07B 61/00; G11B 7/245; C07C 45/81; C07C 49/255; C01F 7/144; C01P 2004/61; C01P 4/03; C02F 1/30; C02F 1/48; C02F 1/005; C02F 2303/22; G02B 5/208; Y02W 10/37
  See application file for complete search history.

(56) References Cited

U.S. PATENT DOCUMENTS

| | | | |
|---|---|---|---|
| 5,306,980 | A | 4/1994 | Montgomery |
| 7,353,873 | B2 | 4/2008 | Borst et al. |
| 7,972,390 | B2 | 7/2011 | Blum et al. |
| 9,011,700 | B2 | 4/2015 | Eng et al. |
| 9,415,106 | B2 | 8/2016 | Choi et al. |
| 9,784,092 | B2 | 10/2017 | Southgate et al. |
| 10,287,193 | B2 | 5/2019 | Fahs et al. |
| 2002/0127278 | A1 | 9/2002 | Kipp et al. |
| 2006/0124443 | A1* | 6/2006 | Tuschel ................ G11B 7/245 204/157.92 |
| 2007/0154825 | A1 | 7/2007 | Tamoto et al. |
| 2007/0242395 | A1 | 10/2007 | Bailey |
| 2008/0306283 | A1 | 12/2008 | Takeda et al. |
| 2009/0242407 | A1 | 10/2009 | Shiga |
| 2010/0151310 | A1 | 6/2010 | Takita et al. |
| 2012/0132196 | A1 | 5/2012 | Vladyslavovych |
| 2012/0167818 | A1 | 7/2012 | Blum et al. |
| 2014/0014375 | A1 | 1/2014 | Boerrigter et al. |
| 2015/0167455 | A1* | 6/2015 | Irani .................... G01N 21/01 73/152.23 |
| 2019/0152808 | A1 | 5/2019 | Krummel |
| 2019/0241443 | A1 | 8/2019 | Krummel |

FOREIGN PATENT DOCUMENTS

| | | |
|---|---|---|
| WO | WO 16/036961 | 3/2016 |
| WO | WO 17/023186 | 2/2017 |

OTHER PUBLICATIONS

Atkins, et al., "8.12 Temperature and Solubility," *Chemical Principles: The Quest for Insight*, 2d Edition, 1999, p. 417.

Weir et al., "Infrared Studies of Aragonite, Calcite, and Vaterite Type Structures in the Borates, Carbonates, and Nitrates," *Journal of Research of the National Bureau of Standards—A, Physics and Chemistry*, vol. 65A, No. 3, 1961, pp. 173-183.

International Search Report and Written Opinion dated Nov. 8, 2017, PCT/US2017/041944, 10 pages.

Hamilton, D.S. and Herman, B., 2011, The Application of Passive Energy to Production Optimization; Stabilizing the Micelle Structure in Oil to Prevent Deposition of Paraffin, Asphaltenes, and Mineral Scale and Reduce Well-head Viscosity in Heavy Oil. Society of Petroleum Engineers, SPE Paper No. WVS 071, Maracaibo, Venezuela.

Nash, Susan, Aug. 9, 2016: Learn! Blog *Innovators in Geosciences Series* "Interview with Monte Swan on Earth Processes and Nano-Scale Solutions"; American Association of Petroleum Geologists 2021: 3 pages.

Sulaiman, A. D. I., Ajienka, A. J. and Sunday, I. S., Mar. 29, 2011: "Application of Piezoelectric Energy Generated from Quartz Plus Semiprecious Metals on Wax Deposition Control" *Journal of Petroleum and Gas Engineering*; vol. 2(5) pp. 93-98, May 2011: http://www.academicjournals.org/JPGE.

Douglas S. Hamilton et al., "The Application of Passive Energy to Production Optimization; Stabilizing the Micelle Structure in Oil to Prevent Deposition of Paraffin, Asphaltenes, and Mineral Scale and Reduce Well-head Viscosity in Heavy Oil"; Western Venezuela Petroleum Section; SPE International; SPE WVS 071; 2011 Society of Petroleum Engineers; pp. 1-7.

U.S. Appl. No. 16/320,042, filed Jan. 23, 2019, Krummel.

\* cited by examiner

BAND-PASS FILTER

CROSS-REFERENCE TO RELATED APPLICATIONS

This application is a 35 U.S.C. § 371 application of PCT/US2017/041944, filed Jul. 13, 2017, which claims the benefit under 35 U.S.C. § 119(e) of U.S. Provisional Patent Application No. 62/361,654 filed Jul. 13, 2016, U.S. Provisional Patent Application No. 62/367,430, filed Jul. 27, 2016, and U.S. Provisional Patent Application No. 62/502,016, filed May 5, 2017, the contents of which are incorporated by reference as if fully disclosed herein.

FIELD OF THE INVENTION

Band-pass filter embodiments herein are used to guide favorable crystal polymorphism in oil, as well as, reduce interfacial tension in oil between the constituents of oil and water.

BACKGROUND OF THE INVENTION

Crude oil is a major fuel source, and is involved in the production of many synthetic materials, such as plastics. Crude oil is a liquid composed of a range of hydrocarbon and organic constituents, including paraffins, naphthenes, aromatics, asphaltics, resins, metallics, and other like materials.

Crude oil production typically relies on pumping oil from deep underground reservoirs to the surface via various production equipment and pipeline. The movement of the oil from the subsurface to the surface results in dramatic environmental changes on the oil, including changes related to pressure and to temperature. These pressure and temperature changes on the oil have effects on the constituents that make up the oil, including the interfacial tension between the various phases of the oil (essentially oil and water).

Particularly problematic constituents of crude oil are paraffin and asphaltene. These constituents of oil at particular temperatures, pressures, and concentrations tend to nucleate and deposit on pipeline and pipeline equipment, thereby limiting the flow of oil as the pipeline becomes occluded. In fact, paraffin and other hydrocarbon precipitation and buildup over time often requires remedial intervention, as hydrocarbon precipitate can occlude a pipeline to the point of inoperability. These concerns are also prevalent for the transport of crude oil in surface pipeline to refineries. Well over 50% of the oil in the U.S. is transported from the point of production to refineries via pipeline. As with the subsurface pipeline, surface pipeline can also become occluded by hydrocarbon precipitate and buildup, and have increased viscosity due to emulsions formed between the recovered oil and water.

Conventional techniques for confronting the material deposition and emulsion problem include: heating the pipeline to enhance paraffin solubility (for example), inclusion of dispersants or crystal modifiers in the oil to slow down crystal formation, inclusion of surfactants to decrease the interfacial tension in the oil, and physical removal of the built-up deposits from the pipe. Each of these approaches is costly, creates additional environmental issues, and/or provides only limited success.

In light of this backdrop, the present disclosure has been developed.

SUMMARY

Figure 1A:
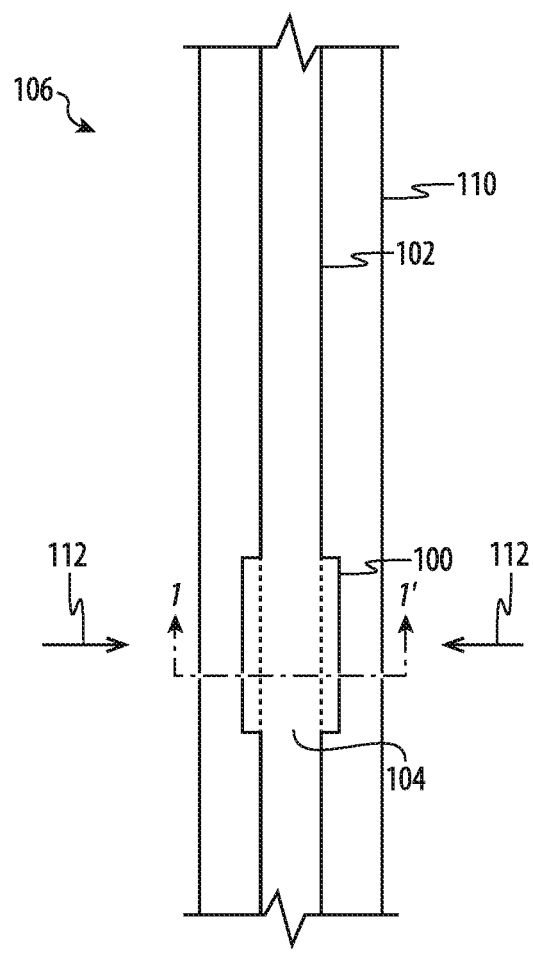
FIG. 1A is an illustrative schematic of a band-pass filter positioned downhole in an oil well in accordance with embodiments herein.

Embodiments in accordance with the disclosure include the use of various patterns of low energy to modify the constituents and phases of oil to increase both the oil's flow and recovery. The energy imparted into the oil operates to favorably stabilize certain crystal polymorphs in the oil and thereby decrease crystal precipitation out of the oil. In addition, the energy imparted into the oil operates to reduce interfacial tension in the oil, particularly between the oil and any water present in the oil, and thereby breakdown emulsions. In some aspects, the energy imparted into the oil and water emulsion leads to a complete separation of the water and oil into two separate phases.

In one embodiment, a band pass filter in accordance with the disclosure herein is composed of aluminum, at least one transition metal, at least one element selected from Be, Mg, Ca, Sr, Ba, Ra or a combination thereof, and at least one non-metal. In some aspects, the non-metal is present at about 7 weight percent of the total weight of the alloy. In another embodiment, the band pass filter is composed of an alloy formed of 80-95% aluminum by weight, and 5-20% of a combination of one or more of Si, Fe, Cu, Mn, Mg, Cr, Ni, Zn, Ti, Pb, and Sn (by weight).

In some aspects, the low energy results from passive energy being transmitted through a band pass filter and into the oil. Once the oil has passed through the band pass filter and received the transmitted energy, the constituents of the oil are stabilized and are less likely to nucleate or deposit on pipeline or equipment. In addition, the transmitted energy causes a decrease in interfacial tension between the oil and any water present, thereby breaking down oil/water emulsions.

In another embodiment, a spectral energy pattern is created by filtering electromagnetic radiation through one or more band pass filters and into oil within a targeted oil field. In typical aspects, the one or more band pass filters is placed at one or more positions along, or within, pipeline used to recover oil in the oil field.

In another embodiment, a spectral energy pattern is created by filtering electromagnetic radiation through one or more band pass filters and into oil within a surface pipeline. In typical aspects, the one or more band pass filters is placed at one or more positions along, or within, pipeline used to transport oil from the oil field. The one or more band pass filters can also be placed at one or more positions used to deliver oil within an oil refinery.

In another embodiment, a method of converting at least one crystal form in a system is described. The method includes filtering electromagnetic radiation through a band pass filter as described herein to obtain at least one spectral energy pattern. The transmitted spectral energy pattern targeting at least one element or compound or mixture thereof having a first crystal form in the system, with the at least one spectral energy pattern, to cause conversion of the first crystal form to a second crystal form. In typical embodiments, at least one element or compound or mixture thereof is a constituent of crude oil, and more particularly, the element or compound is paraffin or asphaltene or a combination of both. Aspects of the method include that the spectral energy pattern is a frequency selected from near infrared, mid infrared, resonant, far infrared or a combination thereof. In more typical aspects, the frequency is far infrared. In other aspects, the second crystal form is more thermodynamically stable in the system as compared to the first crystal form. Aspects of the method also include the system including at least one solvent, which can be polar or non-polar.

In another embodiment, a method for reducing oil viscosity is described. The method optionally includes determining an interfacial tension for the oil under a set of temperature, pressure and water volume constraints, and determining a pattern of electromagnetic radiation based on the constraints necessary to decrease the interfacial tension. A correct pattern of electromagnetic radiation is then applied to the oil, such that the interfacial tension in the oil is lowered by from about 1% to about 10%. The decrease in interfacial tension facilitates the flow of oil. In some embodiments, the pattern of electromagnetic radiation is formed by transmission of electromagnetic radiation through a band pass filter as described herein. In typical embodiments, the decreased oil viscosity is decreased up to two times or more that of an untreated oil.

In still another embodiment, a method of facilitating oil and water emulsion break-up is described. The method includes adding electromagnetic radiation to comingled oil and water, such that the electromagnetic radiation lowers the interfacial tension between the oil and water. In some aspects, the comingled oil and water is from about 1% to about 80% water, by volume, and more typically from about 1% to about 60% water, by volume. The electromagnetic radiation can be applied by transmission through a band pass filter in accordance with the disclosure herein, or directly applied at appropriate energy patterns.

In still another embodiment, a method of enhanced oil recovery is described. The method includes introducing an enhanced oil recovery agent into a target oil field, and introducing a predetermined spectral energy pattern into the same target oil field. The spectral energy pattern produces a 1 to 10% reduction of the interfacial tension of the oil in the oil field, and thereby increases the enhanced oil recovery over recovery with the enhanced oil recovery agent alone. In some aspects, the enhanced oil recovery agent is water or steam. In other aspects the enhanced oil recovery agent is $CO_2$ or one or more surfactants. Where the agent is water or steam, the recovery agent can be passed through a band pass filter prior to, or during, injection into the oil field. Alternatively, the agent can be injected into the oil field, and the comingled oil and recovery agent passed through the band pass filter.

Finally, a kit for enhanced oil recovery in an oil field is described. The kit can include one or more enhanced oil recovery agents and one or more band pass filters. In some cases, instructions are provided on where and how to place and install the one or more band pass filters. In some cases, the oil recovery agent is water.

DESCRIPTION

Embodiments herein generally relate to inputting certain patterns of spectral energy into oil in order to limit constituent precipitation out of the oil and, where water (or other polar solvent) is present in the oil, to breakdown the emulsions caused by oil and water. As oil is almost always present in a comingled state with water, the combined effects of the target spectral energy is to facilitate the stability and flow of oil as it flows from its source to its destination point.

In some embodiments, the source of oil is oil in an underground oil field, in other embodiments, the source of oil is oil flowing in a surface pipeline.

Embodiments also generally relate to enhancing the recovery of oil from oil fields, and in particular, depleted oil fields. In such cases, the spectral energy is combined with other enhanced oil recovery agents to maximize oil recovery from the site. Enhanced oil recovery agents include: water, steam, $CO_2$, surfactants, and the like. In typical embodiments, the oil recovery agent is water.

In more detail, embodiments herein include band-pass filters that selectively transmit spectral energy patterns from an input passive energy source. The transmitted spectral energy patterns are used to drive or guide less stable crystal forms to more stable crystal forms, or polymorphisms, found in oil (or, more generally, in a system). For purposes herein, a system is the totality of what makes up the fluid within an oil reservoir or field, for example, the system includes the constituents of the oil, water, particulates, and the like. By doing so, band-pass filters stabilize molecular dispersions, and promote molecular solubility, of numerous constituents of oil. Embodiments herein also include manufacturing methods for preparing these same band-pass filters.

Further, embodiments include methods of using band-pass filters for guiding useful crystal polymorphisms in oil, for example, guiding less stable hydrocarbon materials in crude oil to more stable polymorphs in crude oil. Methods include, use of a band-pass filter in oil production wells that have, or potentially could have, hydrocarbon deposits that limit oil flow within recovery pipes or pipeline equipment. In addition, methods can include the use of a band-pass filter in a surface pipeline used to transport oil from one point to another destination point, i.e., pipeline used to transport oil from the oil well to a refinery, or oil from the oil well to another oil transportation mode.

Embodiments herein also include band-pass filters that selectively transmit spectral energy patterns used to decrease interfacial tension in the oil within the system. By doing so, band-pass filters remove the need to include other interfacial tension decreasing materials or techniques for oil recovery, for example, surfactants. Oil having a decreased interfacial tension has decreased viscosity, and therefore increased flow.

Embodiments herein also include band-pass filters that selectively transmit spectral energy patterns into water, steam or $CO_2$, for example, useful in enhanced oil recovery from oil fields or wells, particularly where depleted. With respect to water and steam, the water and/or steam can be passed through the band pass filter prior to, or during, injection into the depleted well or field, or can be comingled with the oil in the well and then passed through one or more band pass filters. In some aspects, the water and steam can be passed through the band pass filter prior to injection, and the comingled water and oil in the depleted well passed through one or more band pass filters while being recovered from the depleted oil well.

Alternatively, where the enhanced oil recovery agent is a chemical dispersant, $CO_2$, or other known recovery agent, one or more band pass filters can be placed into the depleted oil well or field to reduce oil interfacial tension and increase the depleted oil well recovery. In general, decreased interfacial tension results in decreased viscosity within the oil, as will be discussed in greater detail throughout.

Embodiments also include designing energy landscapes through the use of a band-pass filter so as to transmit specific spectral energy patterns for conversion of one target crystal structure to another target crystal structure, or to increase the overall interface between adjacent phases in the oil, e.g., oil and water. Design requirements identify useful spectral energy patterns for conversion of one crystal polymorph to a more stable crystal polymorph in a target liquid, where the band-pass filter is then designed to transmit the resultant pattern. In alternative embodiments, molecular dynamic simulations are performed to identify the natural vibrational frequencies of target crystals or aggregates (nanoaggregates and nanocrystals), such that band-pass filters can be tuned to replicate the molecular dynamic simulation necessary to convert a less stable crystal polymorph to a more stable crystal polymorph. The same procedure is used where the motivating factor is interfacial tension requirements of the oil, for example, where enhanced oil recovery techniques would typically be employed to recover oil from a reservoir. In this aspect, spectral energy patterns are identified for minimizing the required interfacial tension required to result in useful oil recovery from a particular or target well site.

In some embodiments, metallic materials can intervene between the band-pass filter and the liquid. For example, passive external energy passes through the band-pass filter and is transmitted as a first spectral energy pattern, which is then passed through a metallic material, for example the wall of a copper or steel pipe, prior to interacting with the oil. In typical embodiments, the intervening metallic material has little, or only a small effect, on the transmitted spectral energy pattern. Further, in some embodiments, the intervening material has no effect on the transmitted spectral energy pattern. Device, method and design embodiments herein can include the intervening metallic material. Intervening metallic materials include: copper, iron, tin, steel, aluminum, and the like, and can have a wall thickness based on the pressure and velocity of the constrained oil. It is contemplated that intervening materials that adsorb or block significant amounts of transmitted energy be avoided, for example, PVC or other polymer based materials.

In aspects herein, band-pass filters are characterized such that when exposed to a passive external energy source, the band-pass filter oscillates, tuning the filter to be in resonance with the different types of molecular oscillations pertinent to fluids of interest, oil in this case. Although not bound by any one theory, the input passive energy source and the output spectral energy pattern are tied to the frequency of the energy. A factor in how the resultant spectral energy resonates with the crystals in the oil, or phases of the oil, is based on the frequency of the energy. If the frequency of the band-pass filter spectral energy pattern does not match the oscillations of the crystals in the oil, or the emulsion in need of de-emulsification, the energy may be reflected or simply pass through the oil. Where a band-pass filter spectral energy pattern can be matched to a target crystal, or emulsion, and the energy resonates, the energy is capable of interacting and converting the crystal structure and emulsion phases.

Embodiments herein will now be described in greater detail.

Band-Pass Filters

Band-pass filters are typically composed of aluminum-based alloys. Typical filters are composed of about 80-95% Al (by weight) and about 5-20% of a combination of one or more of Si, Fe, Cu, Mn, Mg, Cr, Ni, Zn, Ti, Pb, and Sn (by weight). More typically, band-pass filters can also be about 90-95% Al, by weight, and about 5-10% of one or more of Si, Fe, Cu, Mn, Mg, Cr, Ni, Zn, Ti, Pb, and Sn (by weight), and in alternative embodiments, about 90-90% Al, by weight, and about 5-10% of one or more of Si, Cu, Mn, and Mg, by weight. In one aspect, a band-pass filter is composed of the compositions as shown in Table 1.

TABLE 1

Illustrative Band-Pass Filter Compositions

| Element | Minimum (by weight) | Maximum (by weight) | Illustrative Embodiment (by weight) |
| --- | --- | --- | --- |
| Al | 84.15% | 91.1% | 87.67% |
| Si | 7.5% | 8.80% | 7.61% |
| Fe | 0 | 0.8% | 0.59% |
| Cu | 1.0% | 2.0% | 1.48% |
| Mn | 0.2% | 0.6% | 0.32% |
| Mg | 0.2% | 0.6% | 0.46% |
| Cr | 0 | 0.35% | 0.04% |
| Ni | 0 | 0.25% | 0.14% |
| Zn | 0 | 1.75% | 1.61% |
| Ti | 0 | 0.25% | 0 |
| Pb | 0 | 0.1% | 0.06% |
| Sn | 0 | 0.25% | 0.02% |

In an alternative embodiment, a band-pass filter comprises an alloy having the following formula (in weight percent): $Al_d(M_aX_bZ_c)$, where M is at least one transition metal; X is at least one element selected from the group consisting of Be, Mg, Ca, Sr, Ba, Ra, or a combination thereof, and Z is at least one non-metal, and where a, b and c are from 5 to 20 weight % combined, and where $d=100-a-b-c$.

Elements that constitute the band-pass filter alloy are combined by the weight percents above and heated to a temperature of between about 1320° and about 1450° K. In more detail, the aluminum is added to a cold furnace with other required elements, and allowed to heat to the appropriate temperature over a 2.5 to 3 hour period. Each additional heating (making another band-pass filter in the same furnace), once the furnace has been heated, takes approximately 1.5-2 hours. A melting furnace can be a 2 million BTU burner that can use natural gas and air combination flame. Other melting furnaces can also be used, as long as they're capable of reaching the appropriate temperature in the appropriate amount of time.

Heated alloy is poured into a band-pass filter mold and allowed to cool at room temperature. Typical cooling takes between 20-45 minutes. Once a band-pass filter part is solidified in a mold, it is removed or shaken out.

In one embodiment, the band-pass filter is molded to form a part that fits snugly around a pipe used for oil transport, for example, pipeline used to transport oil from point A to point B. Typical band-pass filters can have different sizes and shapes to facilitate transmission of the target spectral energy pattern. For example, band-pass filters can be from 2⅜" diameter to 3½" diameter, and 40-50 inches in length, and more typically 45 inches in length. Band-pass filters also tend to weigh between 31-65 lbs. Several illustrative embodiments are described below, although any size and dimension is envisioned as long as the band-pass filter is capable of transmitting the appropriate spectral energy pattern from an external energy source:

| Unrestricted ID | OD | Length | Tubing weight | Grade | Total Weight |
|---|---|---|---|---|---|
| 60.33 mm - 2⅜" Diameter | | | | | |
| 50.64 mm 1.995" | 88.9 mm 3.5" | 1.152 m 45" | 6.99 kg/m 4.7 lb/ft | J-55 EUE | 14.5 kg 31.92 lb |
| 73 mm - 2⅞" Diameter | | | | | |
| 61.98 mm 2.441" | 108 mm 4.25" | 1.152 m 45" | 9.67 kg/m 6.50 lb/ft | J-55 EUE | 20.86 kg 45.89 lb |
| 88.9 mm - 3½" Diameter | | | | | |
| 76 mm 2.99" | 127 mm 5.25" | 1.152 m 45" | 13.84 kg/m 9.3 lb/ft | J-55 EUE | 29.54 kg 65 lb |

Alternative embodiments include different sized band-pass filters as shown below.

| Casing Weight | | \multicolumn{2}{c}{OD} | | \multicolumn{2}{c}{ID} | | Casing Clearance | |
|---|---|---|---|---|---|---|---|---|---|
| kg/m | lb/ft | mm | in | mm | in | mm | in | mm | in |
| Illustrative Part 1 | | | | | | | | | |
| 14.1 | 9.5 | 104 | 4.09 | 88.9 | 3.5 | 50.64 | 1.99 | 15 | 0.59 |
| 15.6 | 10.5 | 103 | 4.05 | 88.9 | 3.5 | 50.64 | 1.99 | 14 | 0.55 |
| Illustrative Part 2 | | | | | | | | | |
| 20.8 | 14 | 127 | 5.01 | 107.95 | 4.25 | 61.98 | 2.44 | 19.35 | 0.76 |
| 23.1 | 15.5 | 126 | 4.95 | 107.95 | 4.25 | 61.98 | 2.44 | 17.78 | 0.7 |
| Illustrative Part 3 | | | | | | | | | |
| 29.8 | 20 | 164 | 6.456 | 133.35 | 5.25 | 76 | 2.99 | 27.43 | 1.08 |
| 73.7 | 49.5 | 141 | 5.54 | 133.35 | 5.25 | 76 | 2.99 | 7.37 | 0.29 |

Band-pass filters can also be sized to be dropped or fixed into an oil source and not be fitted around the pipes used to transport the oil. The band-pass filter can include one or more passages for the oil to move through, and can be deployed as a sieve or filter that allows for energy transmission into the oil.

In one embodiment, band-pass filters as described herein achieve optimum results when molded into a form that surrounds the crude oil, for example. Passive energy is input through the band-pass filter and transmitted and focused toward the oil constrained, and moving through, the band-pass filter. As discussed previously, a metallic material can intervene between the band-pass filter and oil, for example, a steel pipe used to constrain and carry the oil from the underground reservoir to the oil recovery well surface.

FIG. 1A shows a band-pass filter 100 in accordance with embodiments herein placed around a production pipe 102 used to recover oil 104 from an oil field 106. In this illustrative embodiment, the band pass filter 100 is placed downhole from the surface 108. The band-pass filter 100 is fitted around the pipe 102 and within a casing (optional) 110. Passive energy, arrows 112, supplied by underground heat is transmitted through the casing 110 to the band-pass filter 100, where a resultant spectral energy pattern from the band-pass filter passes through the pipe 102 and into the oil 104.

Figure 1B:
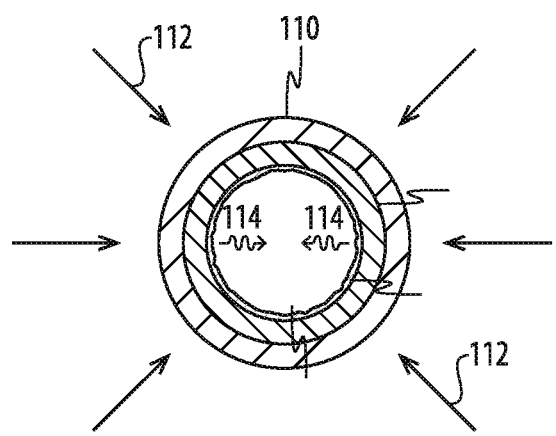
FIG. 1B is a cross-section along line 1-1' of FIG. 1A.

FIG. 1B is a cross-sectional view along line 1-1' of FIG. 1A. The cross-sectional view shows passive energy, arrow 112, move through the casing 110, band-pass filter 100 and pipeline 102 to reach the oil 104. The passive energy 112 is transmitter through the band-pass filter to have a different energy pattern 114 useful in converting unstable crystal polymorphs in the oil 104 too stable crystal polymorphs, and decreasing the interfacial tension in the oil 104, particularly, the interfacial tension between oil and water.

Passive Energy Sources

Embodiments herein require an external, passive energy source. External energy sources herein include all forms of passive electromagnetic radiation, including: radiant or light energy, thermal energy, electric energy, nuclear energy, and the like. In typical embodiments, the energy source provides electromagnetic energy to the band-pass filter, where the electromagnetic energy is modified by molecular oscillations within the band-pass filter to a target spectral energy pattern. The transmitted spectral energy pattern converts one crystal form to another, typically more stable, crystal form. Note that multiple crystalline structures are obtainable in similar solvent systems. This aspect of converting one crystalline form to another crystalline form (but having the same chemical structure) is known herein as polymorphisms.

It is also noted that direct spectral energy patterns can be exposed to the oil in the absence of a band-pass filter. Where the appropriate target spectral energy pattern has been identified for uses herein, the energy pattern can be directed into the oil, without being passed through the band-pass filter, using an arbitrary waveform generator.

A transmitted spectral energy pattern refers to the totality of energy that transmits from the band-pass filter. Band-pass filters are formed such that the material in the band-pass filter interacts with the passive external energy to oscillate and, once oscillating, transmit a different, more useful, spectral energy pattern. In some embodiments, the transmitting pattern is in resonance with the different types of molecular oscillation found in oil. The transmitted pattern is also in resonance with emulsion break-down, causing the oil and water, for example, to separate. Transmitted energy patterns can include various low frequency energy, including near-infrared, mid-infrared, and far-infrared.

Crystal Polymorphism

Band-pass filters are typically positioned to transmit energy to oil, where the transmitted energy pattern resonates with crystal structures therein to modify the crystal structures for a particular use. In one aspect, the crystal polymorphism for paraffin is driven to crystal forms that are stable and remain in oil rather than precipitate out of the oil. In another aspect, the crystal polymorphism for asphaltene is driven to crystal forms that are stable and remain in oil rather than precipitate out of the oil. In other aspects, multiple types of crystals in the oil are modified simultaneously, for example, both paraffin and asphaltene are driven to crystal forms that are more stable and remain in the oil, rather than precipitating out of the oil. In addition, oil that is subject to band-pass filter energy transmission, tends to have a decreased viscosity due to the conversion of undesirable crystal polymorphs to desirable crystal polymorphs, for example, band-pass filter treated crude oil flows more like light sweet oil. In one aspect, viscosity changes in the oil are a result of various bonding arrangements within the treated oil, and can have a significant improvement compared to the flow characteristics of the untreated oil.

In another aspect, two or more band-pass filters can be combined along the same oil pipe to provide more than one spectral energy pattern, such that two different types of resonance with different molecular oscillations pertinent to an oil of interest are treated. So, for example, a first band-pass filter can be tuned to form a more stable paraffin crystal aggregate, and a second band-pass filter, treating the same oil, is tuned to form a more stable asphaltene crystal aggregate. Band-pass filters can be positioned adjacent one another along a pipe or pipeline, or can be separated by 1 or more feet, 10 or more feet, 50 or more feet, 100 or more feet, 500 or more feet, and/or 1,000 or more feet of pipeline. A band-pass filter can transmit the same spectral energy pattern as other band-pass filters, or different energy patterns from other band-pass filters. Band-pass filters can be tuned to transmit different spectral energy patterns by modifications in the composition, thickness, length, etc.

Crystal forms or polymorphism herein refers to a chemical composition or arrangement of molecules and/or macromolecules, which are capable of at least two different crystalline structures or arrangements. For example, one crystal polymorph may have one crystal arrangement more stable than another crystal arrangement in a particular solvent. In this use, stability refers to thermodynamic stability, or a crystal arrangement that is more thermodynamically stable than another crystal arrangement. As such, thermodynamic stability herein generally refers to the molecular solubility of a crystal in a liquid, for example, an unstable crystal will tend to precipitate and deposit, whereas a stable crystal will tend to remain soluble and not precipitate, or precipitate to a significantly lower amount than its unstable polymorph. Crystals can refer to and include nanoaggregates and nanocrystallites.

Figure 2:
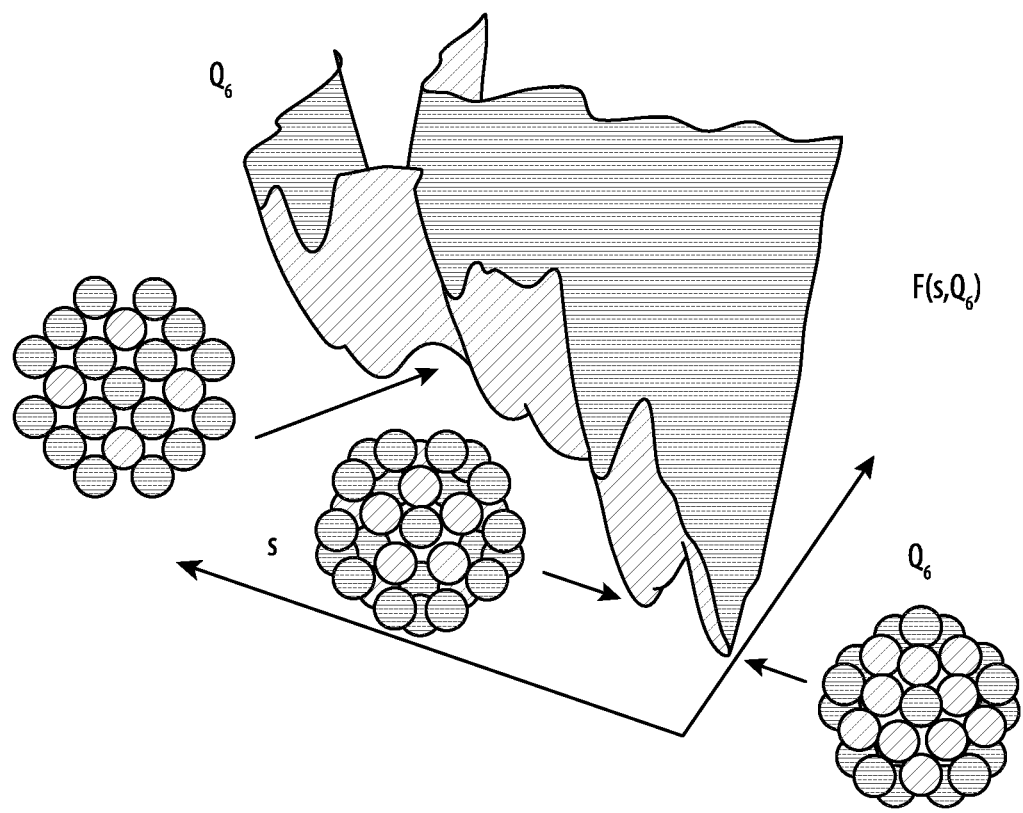
FIG. 2 is an illustrative energy landscape showing the local minima for two polymorphs of a nanoaggregate.

An energy landscape herein refers to a N-dimentional map; for example a 3-dimensional surface showing potential on the Y-axis, and coordinates $V_1$ and $V_2$ on the X- and Z-axis, respectively. As shown in FIG. 2, an energy landscape of nanoaggregates and nanocrystallites show local minima, each with its own characteristic. Design of the spectral energy pattern to accomplish the conversion of a less stable nanoaggregate or nanocrystal to a more stable nanoaggregate or nanocrystal requires conversion between local minima. The spectral energy pattern that results from the energy landscape can be used to design appropriate band-pass filters, or can be used for direct transmission into the oil.

Interfacial Tension

Band-pass filters also decrease interfacial tension in oil. Decreased interfacial tension allows for decreased viscosity and increased flow, and therefore recovery, of oil from an oil well or an oil field. In this light, oil in oil fields typically includes some amount of comingled water. The amount of water that comingles with the oil varies, but is usually in amounts of from less than 1% to as high as 80% by volume, and more typically from less than 1% to about 60% by volume, of the total oil and water combination.

In general, comingled water and oil form emulsions, where the oil can be the continuous phase and the water the dispersed phase (or vice versa). In such situations, the oil and water emulsion shows a viscosity and flow dependent on the percent water, the temperature, the amount of precipitate, and the like. Interfacial tension between the oil and water can lead to the two phases coalescing, thereby allowing for settling of particulates and precipitates.

Currently, emulsifying agents are typically used to limit precipitate settling out of oil emulsions. In one embodiment herein, selective transmission of spectral energy to oil lowers the interfacial tension between the oil and water thereby facilitating the breakdown of the oil and water emulsion. In one aspect, one or more band pass filters are used to selectively transmit spectral energy from an input passive energy source. The transmitted spectral energy lowers the interfacial surface tension between the oil and water, which in turn breaks down the oil and water emulsion. The decrease in interfacial tension leads to decreased oil viscosity, and increased oil flow, and also limits precipitate settling.

Limiting interfacial tension and demulsifying oil and water also limits the work required to remove water from the oil once recovered. Oil that has been produced from a well must be separated from comingled water prior to sale to meet oil specifications. In addition, water that remains in oil can lead to oxidation, foaming, formation of insoluble oxides, wax development, as well as rust and corrosion of pipeline and equipment. Separation of water from oil is costly, and requires any number of different removal strategies, including: gravity separation, centrifugation, use of absorption medias, vacuum dehydration, air stripping and/or heating. In embodiments herein, lowering of interfacial tension by transmitted spectral energy minimizes the cost and time required to separate water from recovered oil.

In alternative embodiments, transmitted spectral energy is combined with one or more emulsifying agents to further lower the interfacial tension of the water. In such embodiments, the addition of transmitted spectral energy is used to lower the requirement for certain amounts of emulsifying agents and/or to increase the effectiveness of the emulsifying agent. The combination of spectral energy and emulsifying agents allows for decreased oil viscosity, and increased oil flow, as well as lower requirements for water removal. Emulsifying agents can include various surfactants.

Embodiments herein also include the selective transmission of spectral energy for enhanced oil recovery (EOR). Aspects include using a band-pass filter in combination with water injection; band-pass filter in combination with gas (e.g., carbon dioxide) injection; band-pass filter in combination with polymer flooding; band-pass filter in combination with thermal (e.g., steam) injection, and the like. As discussed above, introduction of specific transmitted spectral energy lowers the interfacial tension or surface tension of the various phases that result from the enhanced oil recovery procedure. As above, decreased interfacial tension in oil allows for further oil recovery over the use of any one technique alone, e.g., use of $CO_2$ injection alone. The spectral energy can be input into the water or steam prior to, or during, injection into the depleted oil field, or can be transmitted into the comingled oil after the enhanced oil recovery agent (water, steam, $CO_2$, polymers, and the like) has been supplied within the field.

In some embodiments, introduction of transmitted spectral energy lowers the interfacial surface tension in the oil by from about 1% to about 15%, and more typically from about 5% to about 10%. This reduction in the interfacial tension results in a significant destruction of emulsified oil back to non-emulsified oil. In some embodiments, one or more band-pass filters in accordance with embodiments herein are used to transmit the spectral energy into the oil.

In other embodiments, introduction of transmitted spectral energy decreases the oil viscosity by up to two fold, depending on the oil's constituents. A decrease in oil viscosity allows for a corresponding increase in oil flow.

Crystal Polymorphism and Interfacial Tension

In some embodiments, the oil includes both crystal polymorphs in need of thermodynamic stability, and oil comingled with water or oil recovery agents (like water or $CO_2$ flooding), in need of a reduction in interfacial tension. The combined effects of inputting spectral energy, for example by use of passive energy through a band-pass filter, is to both limit crystal or nanoaggregate precipitation, and to break down the oil and water emulsion, such that the oil becomes less viscous with stable crystal polymorphs. In these circumstances, the oil flow and recovery benefit by both limiting unstable crystal polymorphs and interfacial tension. In general, the viscosity of oil can be decreased by two fold or more. Embodiments herein can be placed in or down hole for subsurface oil recover, or on surface pipeline, where both situations benefit. Embodiments also result in separation of water from oil and result in lower cost water removal steps once the oil has been recovered and is ready for transport or sale.

Methods of Use

Embodiments herein include methods for using a band-pass filter, in accordance with embodiments herein, to convert one crystal polymorph to another, more stable, crystal polymorph. Embodiments also include methods that convert more than one crystal polymorph in a liquid to more than one stable crystal polymorphs in the same liquid. For example, methods include converting a crystal x, crystal y, and crystal z to more stable polymorphs of crystal x, crystal y and crystal z, all in the same liquid. Where more than one transmitted spectral energy pattern is required to convert more than one crystal polymorph, additional band-pass filters can be added having the required transmitted energy pattern. Band-pass filters can be used to convert 2 or more types of crystals, 3 or more types of crystals, 4 or more types of crystals, 5 or more types of crystals, and the like, into their more stable polymorph in the same liquid.

Figure 3:
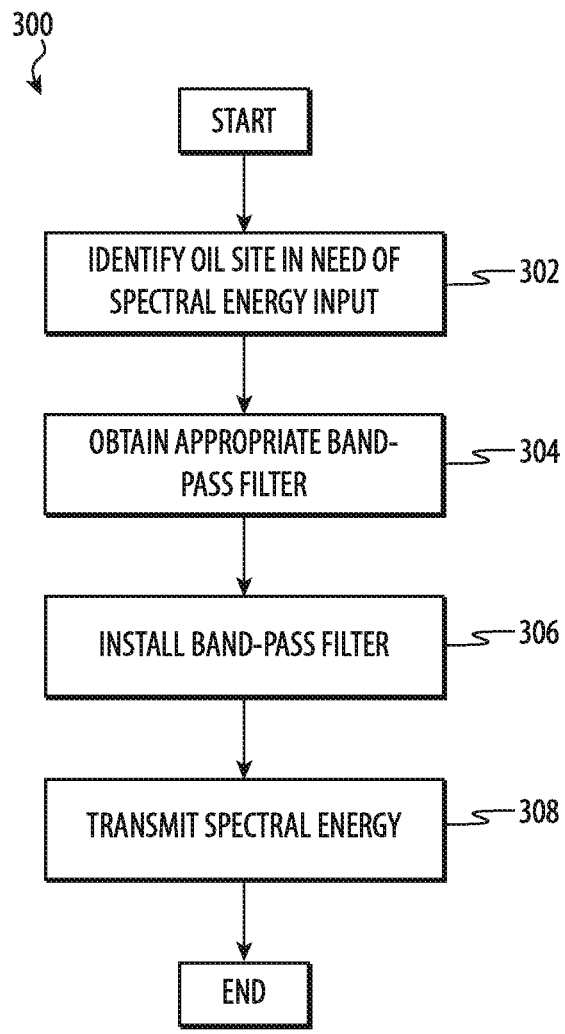
FIG. 3 is a flow diagram of one illustrative method for use of a band-pass filter at an oil production facility in accordance with embodiments herein.

FIG. 3 illustrates one method for using a band-pass filter in accordance with embodiments herein 300. Initially, an oil production facility in need of embodiments herein is identified 302. In some cases, the oil production facility has been in use for an extended period of time. Typically, oil production facilities in use and in need of one or more band-pass filters, include facilities that have shown a drop in oil production over the course of one or more months, and more typically, over the course of three or more months. In some oil production facilities, the facilities have some amount of paraffin deposition, asphaltene deposition, or both paraffin and asphaltene deposition, on pipes or equipment useful in the recovery of the oil. In some cases, the oil production facility is a crude oil production facility. It is also envisioned that oil production facilities may no longer be operational due to existing hydrocarbon depositions in the pipeline or equipment, or, alternatively, be oil production facilities that have not begun recovery, but would be considered at risk of hydrocarbon deposition due to the type of oil being recovered, crude oil with a high paraffin content, for example. Where the production facility has existing paraffin or hydrocarbon deposition problems, band-pass filters of the present invention increase productivity by both limiting deposition, but also by causing some break-down and removal of deposited materials, i.e., although deposited, the crystal aggregates can be converted to more stable and soluble crystals, thereby allowing for the deposits to be broken up as well.

Once the target oil production facility has been identified, an appropriate band-pass filter, having a useful transmitted spectral energy pattern for the particular oil at the oil production facility, is obtained 304. In one embodiment, the band-pass filter has the composition, size and weight to transmit a spectral energy pattern useful in increasing paraffin thermodynamic stability and solubility, or useful in increasing asphaltene thermodynamic stability and solubility, or both paraffin and asphaltene thermodynamic stability and solubility. In some aspects, the band-pass filter is paired to the thickness and composition of the oil production pipeline, to ensure that the resultant spectral energy pattern is useful after transmission through the pipeline to the transported oil. Band-pass filter composition, length, thickness can all be tweaked to obtain the proper filter with the proper transmission patterns.

A properly tuned band-pass filter is then installed within the oil recovery production pipeline 306. Typically, the site of filter installation requires a passive external energy, for example, installation at a depth underground that ensures enough natural heat to drive transmission of a spectral energy pattern useful in, for example, conversion of paraffin to a more stable and soluble paraffin polymorphism. Alternatively, the band-pass filter may transmit energy generated by the frictional movement of the fluids themselves. Typical passive external energy requirements are minimal, as the transmitted energy from the band-pass filter is typically in the near infrared frequency, mid infrared frequency, resonant frequency, far infrared frequency, or combinations thereof. These tend to be the spectral energy patterns that resonate with crystals in the crude oil, for example 308.

Figure 4:
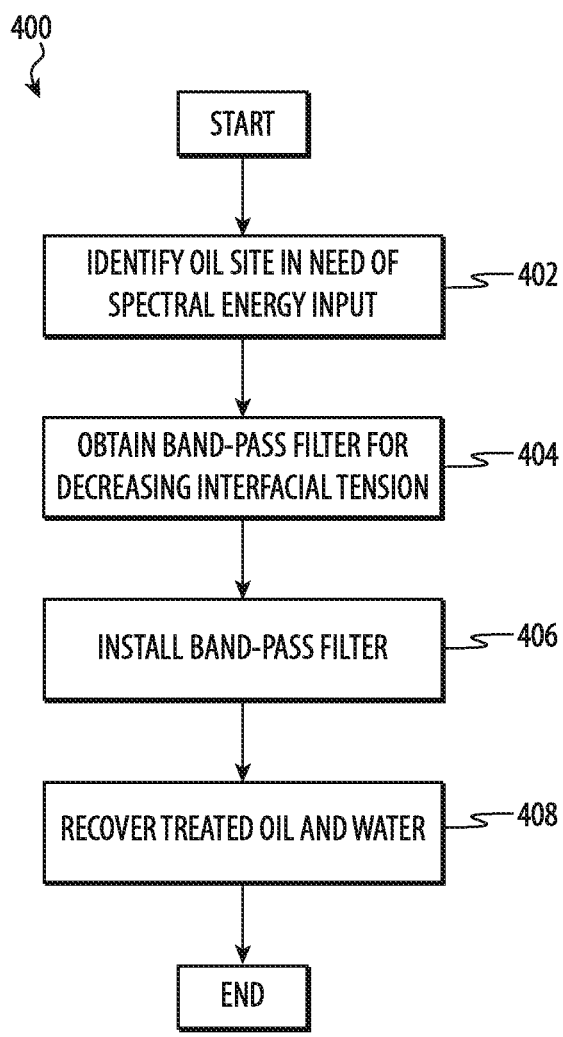
FIG. 4 is an alternative flow diagram of an illustrative method for use of a band-pass filter at an oil production facility in accordance with embodiments herein.

FIG. 4 illustrates another method for using a band-pass filter in accordance with embodiments herein 400. Initially, as in FIG. 3, an oil production facility in need of embodiments herein is identified 402. Once the target oil production facility has been identified, an appropriate band-pass filter, having a useful transmitted spectral energy pattern is obtained. In one embodiment, the band-pass filter has the composition, size and weight to transmit a spectral energy pattern useful in decreasing the interfacial tension of the oil 404. A properly tuned band-pass filter is then installed within the oil recovery production pipeline 406. Treated oil has a decreased interfacial tension and a decreased viscosity, and requires less time and money for water separation 408.

Figure 5:
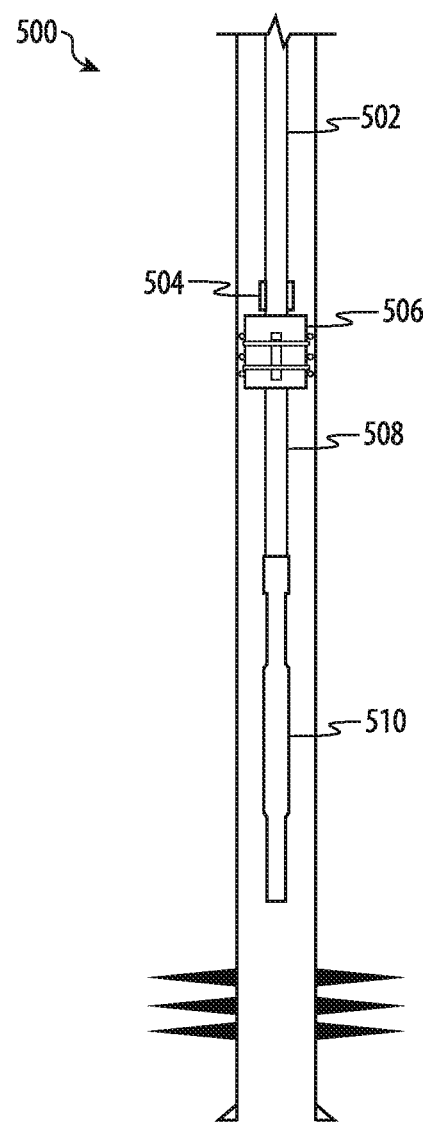
FIG. 5 is an illustrative schematic of a band-pass filter placement in a vertical flowing well with standard packer completion in accordance with embodiments herein.

FIGS. 5 to 8 illustrate several band-pass filter installation configurations in oil wells in need thereof. FIG. 5 shows one embodiment for a vertical flowing well 500 with a standard packer completion and band-pass filter. A production pipe 502 is passed vertically down the well hole and includes a profile nipple 504, packer assembly 506, production casing 508, and band-pass filter of the invention 510.

Figure 6:
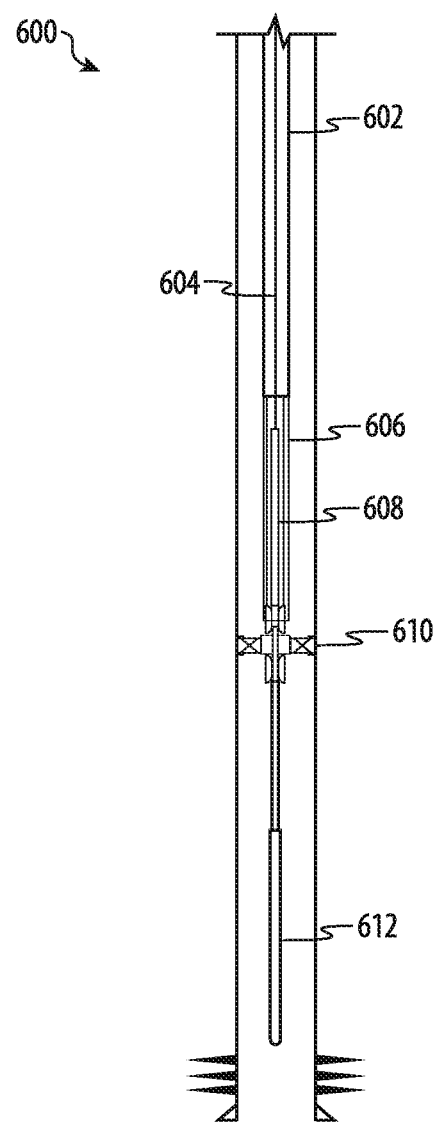
FIG. 6 is an illustrative schematic of a band-pass filter placement in a pumping well in accordance with embodiments herein.

In FIG. 6, an embodiment is shown for a pumping well 600 where the tubing string 602, sucker rod string 604, production tubing 606, rod pump 608, tubing anchor catcher 610 and band-pass filter 612.

Figure 7:
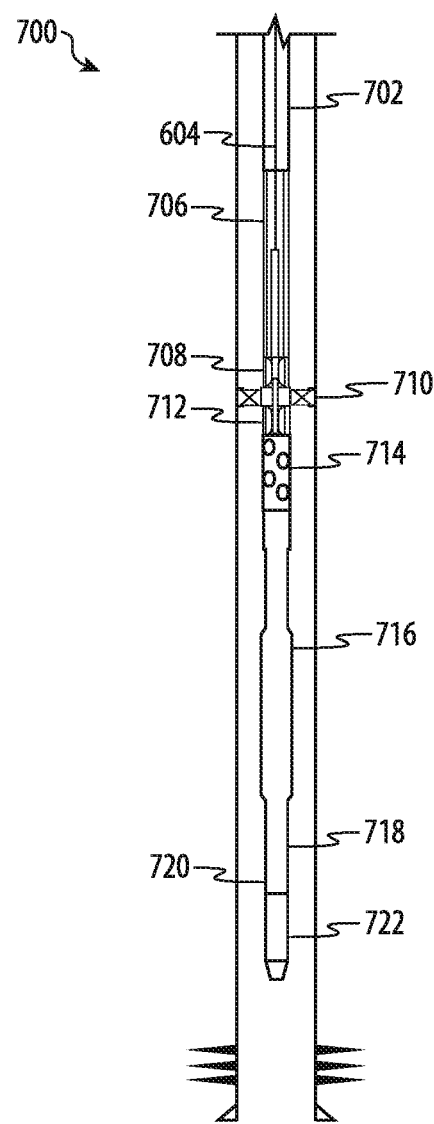
FIG. 7 is an illustrative schematic of a band-pass filter placement in another pumping well in accordance with embodiments herein.

In FIG. 7, a pumping well 700 is illustrated with a downhole Poor Boy Gas Separator and band-pass filter. The illustrations show a tubing string 702, sucker rod string 704, rob pump 706, seating nipple 708, tubing anchor catcher 710, slotted seating nipple 712, perforated sub 714, band-pass filter 716, dip tube gas anchor 718, Poor Boy Separator Tubing Sub 720, and bull plug 722.

Figure 8:
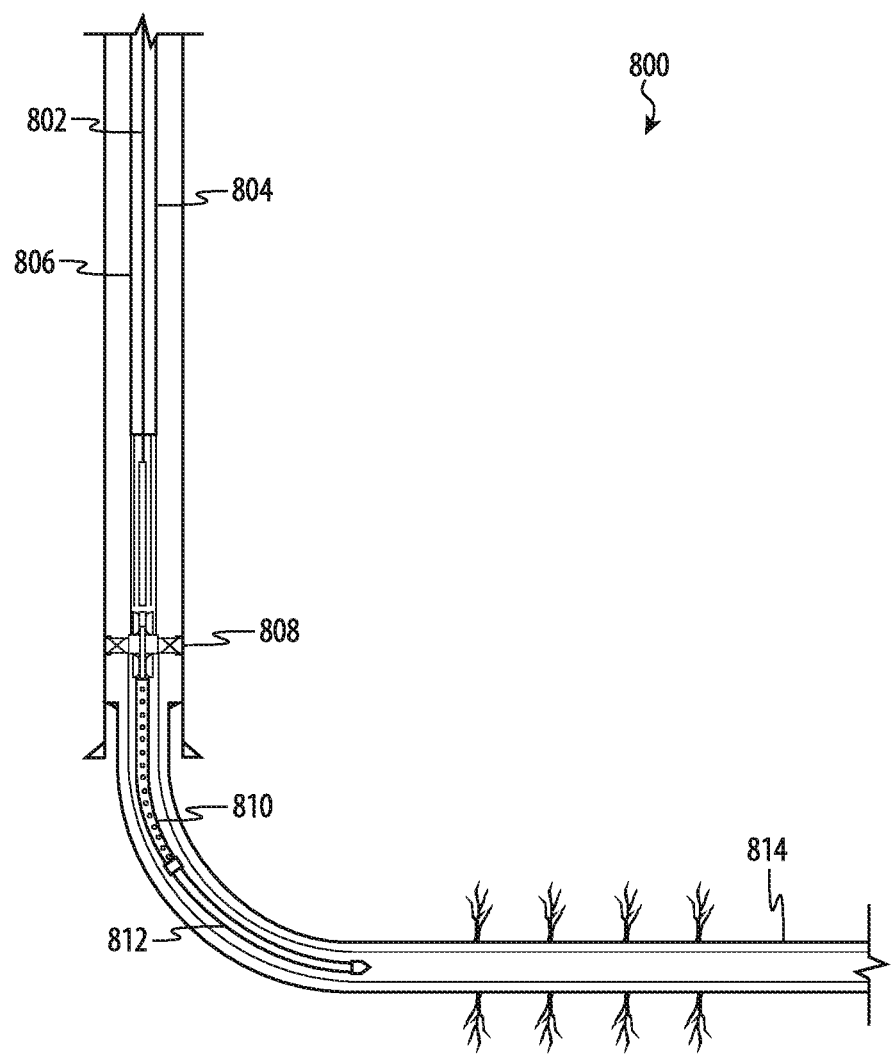
FIG. 8 is an illustrative schematic of a band-pass filter placement in a horizontal or deviated pumping well in accordance with embodiments herein.
Figure 9:
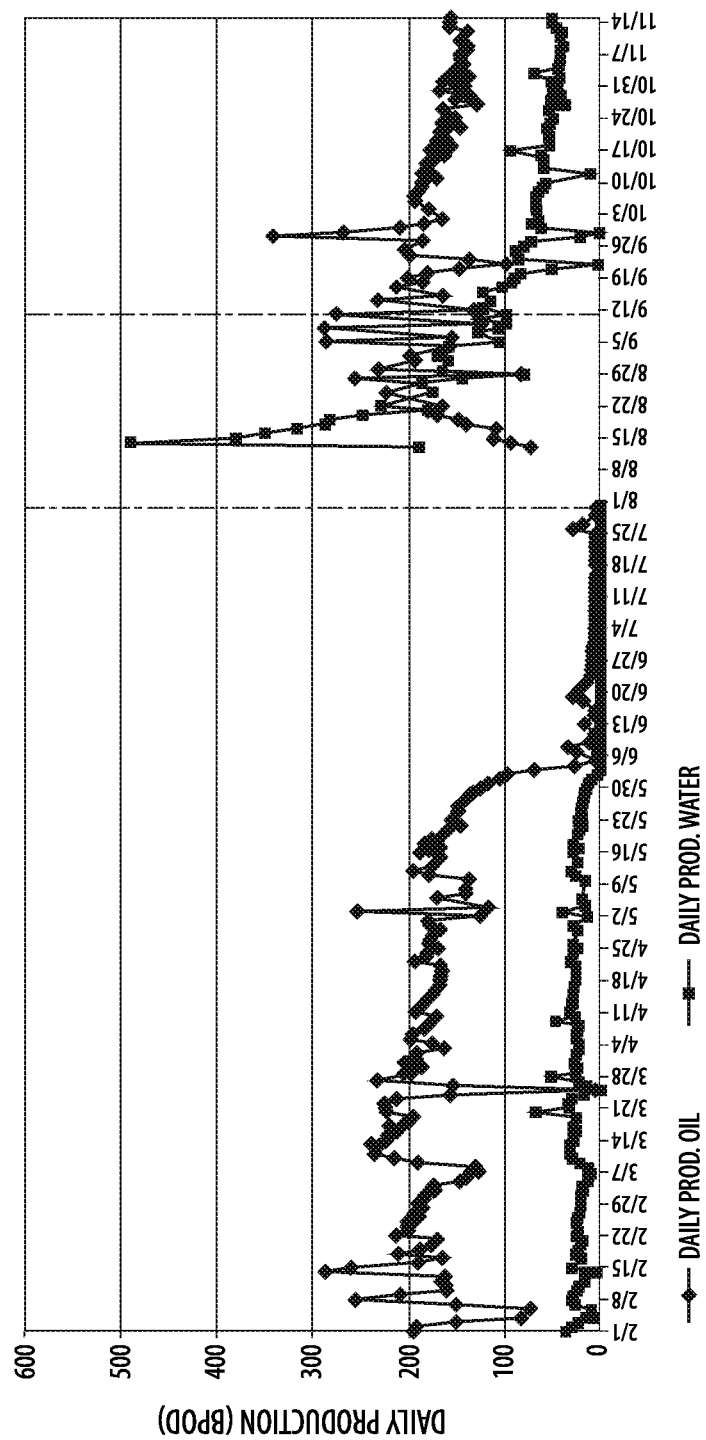
FIG. 9 shows well-logging data from a production well before and after use of a band-pass filter.
Figure 10:
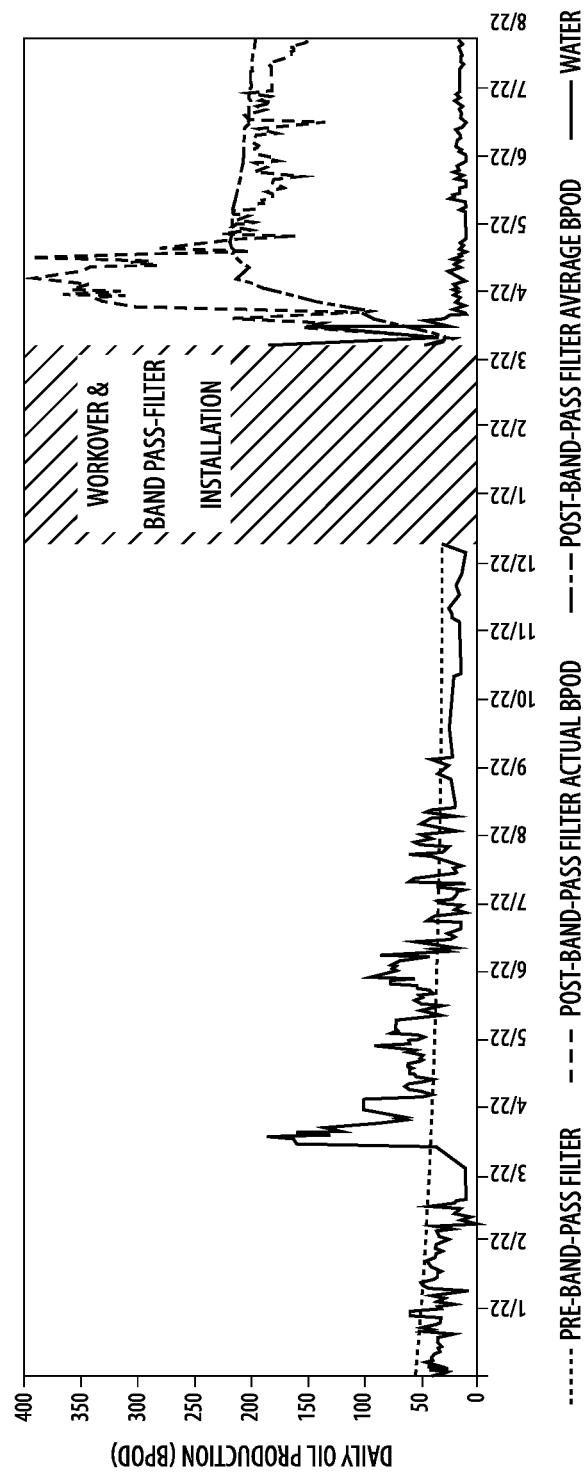
FIG. 10 shows another set of well-logging data from a production well before and after use of a band-pass filter.

Finally, in FIG. 8, a horizontal or deviated pumping well 800 with band-pass filter is shown. The illustration shows a Sucker rod string 802, tubing string 804, production tubing 806, tubing anchor catcher 808, perforated sub 810, band-pass filter 812, and cased horizontal wellbore with staged fracking interval 814.

Band pass-filters can also be used in methods for transporting oil from an oil recovery site to a refinery, or to other like oil processing facility or alternative transportation area. A band-pass filter in accordance with embodiments herein is placed around or within a surface pipeline used to transport oil. Additional band-pass filter can also be positioned alone or within the transport pipeline. The transported oil is affected much the same as the oil from underground wells. A passive energy source, typically sunlight or heat, contacts the band-pass filter and is transmitted through the band-pass filter and into the oil. Stabilization of crystal polymorphs in the water and lowering of interfacial tension allow for lower viscosity and higher oil flow, as well as oil that will less likely deposit or occlude the surface pipeline. Band-pass filters can be placed near or around areas of concern, for example, where a surface pipe narrows for inlets or outlets.

In one embodiment, with regard to the band-pass filter transmitted energy, for oil production or recovery uses, the thermal energy provided to the band-pass filter is transmitted out of the band-pass filter as low energy, long wavelength electromagnetic field(s), including near infrared frequency, mid infrared frequency, resonant frequency, far infrared frequency, or combinations thereof. The low energy, long wavelength electromagnetic field is the spectral energy pattern for the band-pass filter, and the transmitted energy resonates with very low frequency librational motions of the oil. The result is that paraffin, and other target hydrocarbons, convert from a first crystal polymorphic structure to a second, more thermodynamically stable, crystal polymorphic structure. Band-pass filter placement within an oil production facility is determined where, as mentioned above, there is a sufficient energy source, but also where converted crystal polymorphs, once converted by the filter, will generally maintain proper structure to be recovered from the oil reservoir. As such, proper placement of a band-pass filter can be sufficiently close to the reservoir, that pipeline can be protected from hydrocarbon deposition. Hydrocarbons, soluble in the reservoir, can become problematic with temperature and pressure changes, so band-pass filter placement close to the same depth as the reservoir, along the pipeline, can provide excellent protection, although, filters can be placed anywhere along the pipeline and still provide some beneficial aspects to the oil recovery. The transmitted energy also resonates with phase boundaries to lower interfacial tension in the oil. Placement of band-pass filters where viscosity or flow are of concern is also considered herein.

Properly installed band-pass filters can improve oil production, at oil production facilities, by at least 5%, 10%, 15%, 20%, 25%, 30%, 35%, 40%, 45%, 50%, 55%, 60%, 65%, 70%, 75%, 80%, 85%, 90%, 95%, 100%, etc. Oil production is determined by increased flow over the course of each day, each week and/or each month. Increased oil production can be a result of decreased hydrocarbon precipitation, removal of hydrocarbon precipitation on pipeline or equipment, and/or decreases in the oil viscosity. One benefit of the properly installed band-pass filter is the avoidance of pipeline and equipment maintenance, including keeping oil recovery facilities on-line for extended periods of time, as compared to similar facilities that do not have an installed band-pass filter.

Embodiments herein also include methods of using a band-pass filter, in accordance with embodiments herein, to lower interfacial tension in comingled oil and water emulsions. Here, the transmitted energy lowers the interfacial tension in the comingled oil, thereby breaks-up the phases of the oil. Embodiments herein are particularly useful where the volume of water is present in at least 1% by volume and up to about 80% in volume, and more typically, in at least 1% by volume and up to about 60% by volume, and even more typically present between about 5% by volume and about 40% by volume. Where no water is present, the benefit of the band-pass filter is dependent on guiding higher stability forms of crystal polymorphs, as discussed above, or at modifying the interfacial tension between oil and other solvents/solutes in the system.

In an alternative embodiment, transmitted spectral energy from a band-pass filter can be used for enhanced oil recovery from a depleted oil field or well. Typically, oil fields in need of enhanced recovery have various enhanced oil recovery agents added to the oil in hopes of lowing the oils interfacial tension and allowing for recovery of additional oil from the field. In embodiments herein, the band-pass filter can be used alone or in combination with enhanced oil recovery agents to reduce the interfacial tension of the oil. Enhanced oil recovery agents can include water, steam, $CO_2$, surfactants, combinations thereof, and the like. As noted above, the spectral energy patterns herein can be used to pre-treat the water or steam prior to or during injection into the oil field. In some embodiments, inclusion of one or more band-pass filters also allows for use of smaller amounts or concentrations of the enhanced oil recovery agent. For example, combining the use of a band-pass filter with surfactants, may allow for a 5% or more, 10% or more, or 20% or more reduction in the amount of surfactant necessary to achieve the same recovery in the absence of band-pass filters.

The various equipment and instructions necessary to carry out the uses described herein may be embodied as kits. For example, a kit for enhanced oil recovery can include one or more enhanced oil recovery agents, one or more band-pass filters, and instructions on how to place and install the band-pass filter(s).

Design of Band Pass Filters for a Particular Use

Embodiments herein include methods of identifying and designing the proper band-pass filter design for a targeted use. For example, identifying and designing a band-pass filter that transmits a specific spectral energy pattern useful for optimizing crude oil recovery of oil with high levels of naphthenes and asphaltenes. Alternatively, identifying and designing a band-pass filter that transmits a specific spectral energy pattern for use with oil comingled with a specified volume water.

Band-pass filters can be designed to transmit specific ranges of spectral energy so as to provide targeted spectral energy patterns useful in converting one or more crystal polymorphs into one or more different, and thermodynamically more stable, crystal polymorphs. In some embodiments the converted one or more crystal polymorphs are also more soluble, than their non-converted counterparts.

In one embodiment, a target oil recovery well is identified, the well in need of the embodiments described herein. An oil sample is obtained from the well to identify one or more of the crystal polymorphs therein. A first minima energy level is determined for a first crystal, paraffin for example. A second minima energy level is determined for the first crystal, where the second minima is associated with a more thermodynamically stable crystal polymorph (as compared to the first). A spectral energy pattern, for conversion of a first crystal pattern to a second crystal pattern, is now available.

In another embodiment, and for purposes herein, minima of energy may be determined and/or identified via a combination of experiments and/or computational modeling. Computational models can be based on molecular dynamics simulation, for example, see Introduction to Molecular Dynamics Simulation by Michael Allen, NIC Series, Vol. 23, ISBN 3-00-012641, pp 1-28, (2004) (incorporated by reference for all purposes). Computational modeling can be used to provide the spectral energy pattern required to tune and be in resonance with the different types of molecular oscillations pertinent to a fluid of interest, crude oil from well X, for example.

For example, band-pass filters can be used to tune and replicate the energy pattern required to convert the first crystal pattern to the second crystal pattern. Band-pass filters can be tuned by modifying the composition of the filter, modifying the total weight of material present in the filter, modifying the length of the filter in contact with the oil, modifying the thickness of the filter material in contact with the oil, modifying the intervening metal between the band-pass filter and the oil, and the like. Tuning is also modified by the type and extent of the external energy. Each of the above parameters is taken into account when designing the proper band-pass filter for any given use.

In this light, embodiments also include the design of multiple band-pass filters (or one band-pass filter with different portions) that transmit different energy patterns required to convert two or more first crystal polymorphs to two or more second (more stable) crystal polymorphs.

Band-pass filters can also be designed to transmit specific ranges of spectral energy so as to form a broken down emulsion for a target oil field, or for use with an enhanced recovery agent or technique(s). In this light, band-pass filters are used to tune and replicate the energy pattern required to maximize the reduction of interfacial tension in an oil sample, and thereby separate the water from the oil. Alternatively, the band-pass filter can be tuned to form an energy pattern that maximizes the oil flow, and in some instances, the oil's viscosity.

In one embodiment, a target oil recovery well is identified. An oil sample is obtained from the well to identify the amount or volume of water comingled with the oil. Spectral energy patterns based on various frequencies of energy are input and a determination made as to which pattern forms the greatest decrease in interfacial tension for that particular oil and water emulsion.

Finally, as noted above, band-pass filters can be designed to transmit specific ranges of spectral energy so as to both stabilize oil and decrease interfacial tension of water and oil.

Embodiments herein will now be further described with reference to the following non-limiting examples.

EXAMPLES

Example 1: Oil Production Increase

A band-pass filter in accordance with the present disclosure was installed at a production well to test its effect on oil production. Oil production from a well in the Eagleford Formation is shown in FIG. 9.

The Eagleford Formation is dominated by Eagleford shale and is known for problems with asphaltenic and paraffin wax depositions as well as scale issues. Well production was followed for a set period of time. As shown in FIG. 9, the solid line indicates daily oil production and the dashed line daily water production. In general, if oil production is high, water production should be low. The bold line indicates when the band pass filter was installed at the well. Note that within a month of installing one band-pass filter, oil production increased and water production decreased. The increased production continued to the end of testing at a constant rate. (Justin Tom 02 data from Eagleford Basin).

Example 2: Oil Production Increase

A band-pass filter in accordance with the present disclosure was installed at a production well to test its effect on oil production. Oil production from a well in Venezuela is shown in FIG. 10. The Venezuelan formation is prolific with paraffin and scale, analogous to formations in the Uinta Basin in the United States. In FIG. 10, the solid line shows oil production over a set period of time.

After a band pass filter was installed in accordance with embodiments herein, the dashed line shows oil production per day as well as water production per day. Note the significant increase in oil production once the band pass filter was installed.

Example 3: Oil Production Increase

An oil production site in San Juan County, New Mexico, was identified as in need of increased oil production due to possible hydrocarbon deposition and decreased oil flow concerns. During initial operating conditions, oil production was around 4-5 bbls/day. The production level only lasted one month and quickly fell to 3 bbls/day. After 3 months the well was inoperable and required down-hole pump replacement (costly and time consuming).

After several cycles of down-hole pump replacement, a band-pass filter was placed into the occluded well. The production well had a size of 12¼" (diameter) and a conductor casting of 9⅝". A band-pass filter in accordance with an embodiment herein was lowered into the well hole and oil flow followed. Well flow dramatically increased with band-pass filter installation, going up to 23 bbls/day. This example shows a dramatic and unexpected increase in oil flow and production. The results show the combined assets of limiting hydrocarbon deposition and decreasing oil viscosity.

Example 4: Pour Point Reduction

Pour point was determined for oil samples treated with band-pass filter embodiments as described herein. Samples were tested using an ISL MPP 5Gs with ISO 3016 Certified Reference Material. Test vials were the ISL vial, ref. M004245 and a ISL stopper, ref. M01718.

Each day at the start of pour point measurements, the pour point of the standard described above was measured and recorded. A disposable pipet was used to transfer 0.5 mL of the standard into a test vial. The vial was closed with a vial stopper. The sample vial was loaded into the instrument, and the method performed. The starting temperature was 25° C., and a cooling rate of −1.5° C. min$^{-1}$ used.

For low viscosity samples, that could be manipulated with pipets at room temperature, 0.5 mL of each sample was transferred into a test vial using a disposable pipet. A minimum of triplicate aliquots were prepared from each sample. The vial was closed with a vial stopper. The sample vial was loaded into the instrument, and the method performed: starting temperature: 29° C., cooling rate: −1.5° C. min$^{-1}$.

For high viscosity samples that were too viscous to be manipulated with pipets at room temperature, a small portion (~5 mL) is transferred into a Pyrex beaker. The sample was gently heated on a hotplate until the sample is of low enough viscosity to be manipulated with a pipet. A disposable pipet is used to transfer 0.5 mL of each sample into a test vial. A minimum of triplicate aliquots are prepared from each sample. The vial is closed with a plastic stopper.

The sample vial was loaded into the instrument, and the method described below was performed: starting temperature: 45° C., and cooling rate: −1.5° C. min$^{-1}$.

Based on the parameters above, the methodology and instrumentation was confirmed over a period of 6 weeks. Standard samples showed excellent consistency and accuracy for pour point measurements and no flow point.

Oil samples were tested at three different times after treatment through a band-pass filter in accordance with embodiments herein. Oil tested on 5/30 had a pour point measurement of 17° C. which was reduced to 1° C. after treatment by a band-pass filter; oil tested on 6/2 had a pour point measurement of 19.3+/−0.6° C. which was reduced to 12.3+/−1.5° C. after treatment with a band-pass filter; and oil tested on 6/7 had a pour point measurement of 18.3+/−0.6° C. which was reduced to 12.3+/−1.5° C. after treatment with a band-pass filter.

Example 5: Viscosity Reductions

Quantitative details of fluid behaviors were determined using a DHR-2 Rheometer from TA Instruments.

Figure 11A:
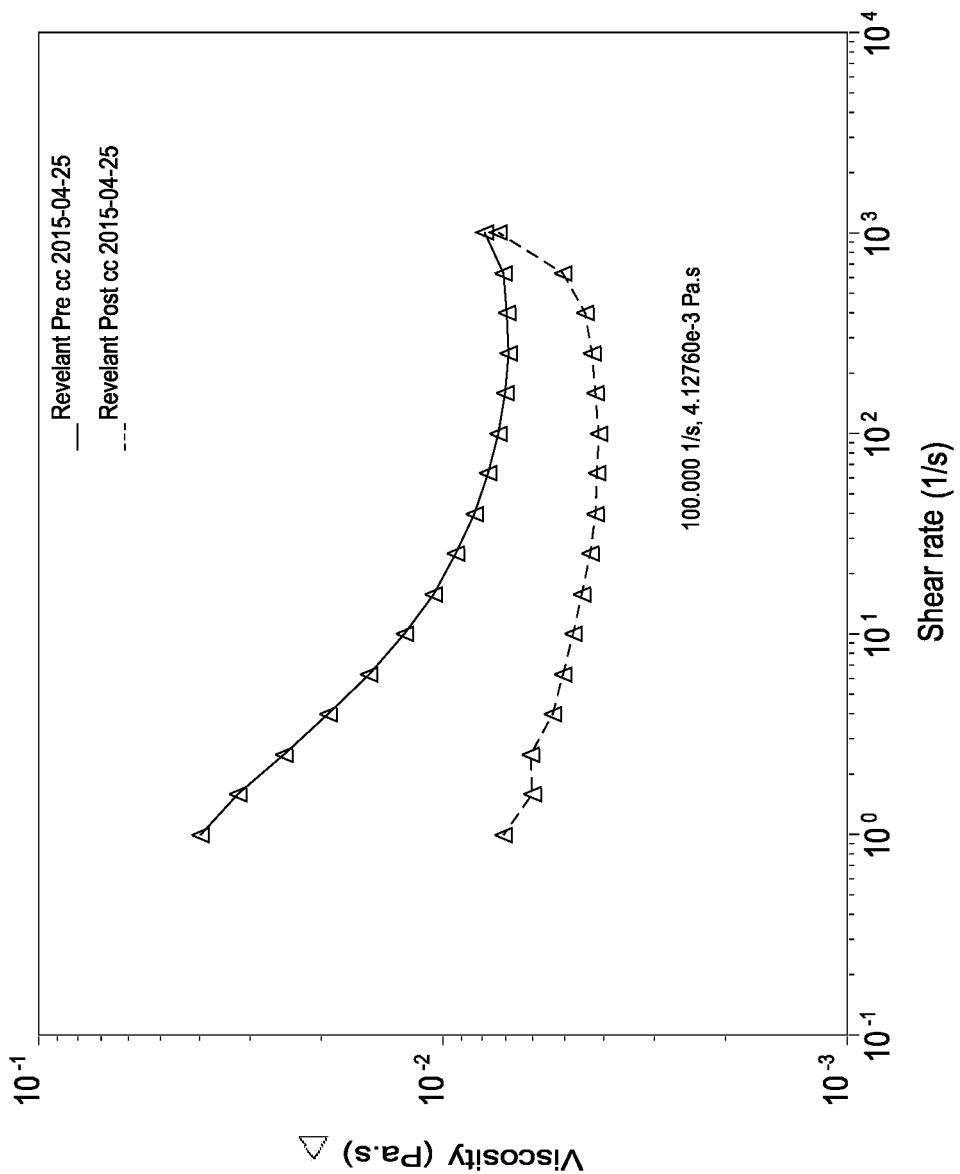
FIGS. 11A and 11B provide rheology data with quantitative details of fluid behaviors.

In FIG. 11A, both pre and post treated oils were found to be non-Newtonian and shear-thinning. At low shear rate, post treated samples were 5.6× lower in viscosity, while at high shear rate, post treated samples were 1.8× lower in viscosity.

Figure 11B:
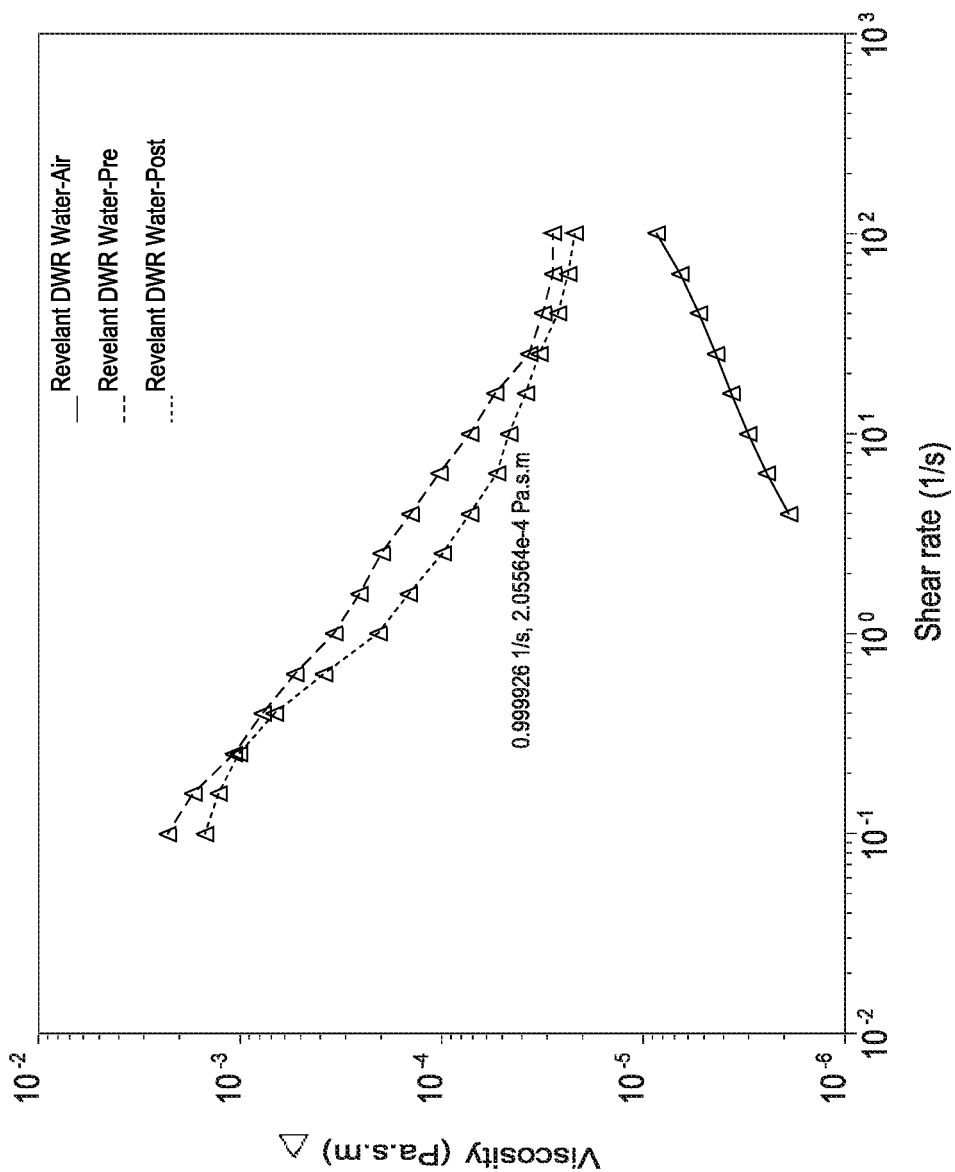

FIG. 11B shows that at moderate shear rates, post treated oil had an interfacial viscosity against distilled water of 1.7× lower than pre treated oil.

Figure 12A:
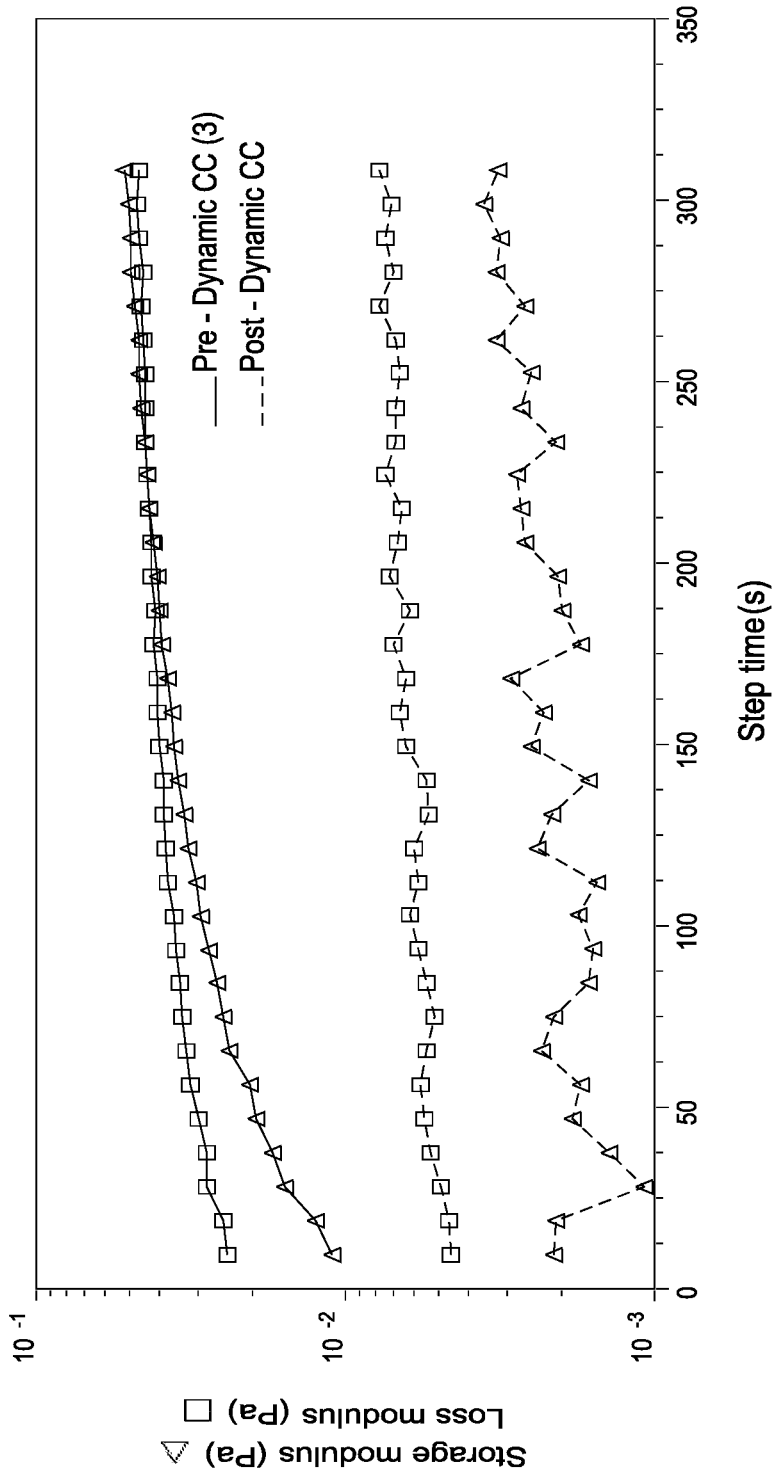
FIGS. 12A and 12B also provides rheology data with quantitative details of fluid behaviors.

Over time, as shown in FIG. 12A, the pre-treated oil built structure, resulting in the increase in storage modulus and loss modulus. Post treated oil had lower storage and loss moduli, and the fluid structure built to a lesser degree over time. Oscillatory measurements were used to determine viscoelastic properties of the fluids.

Figure 12B:
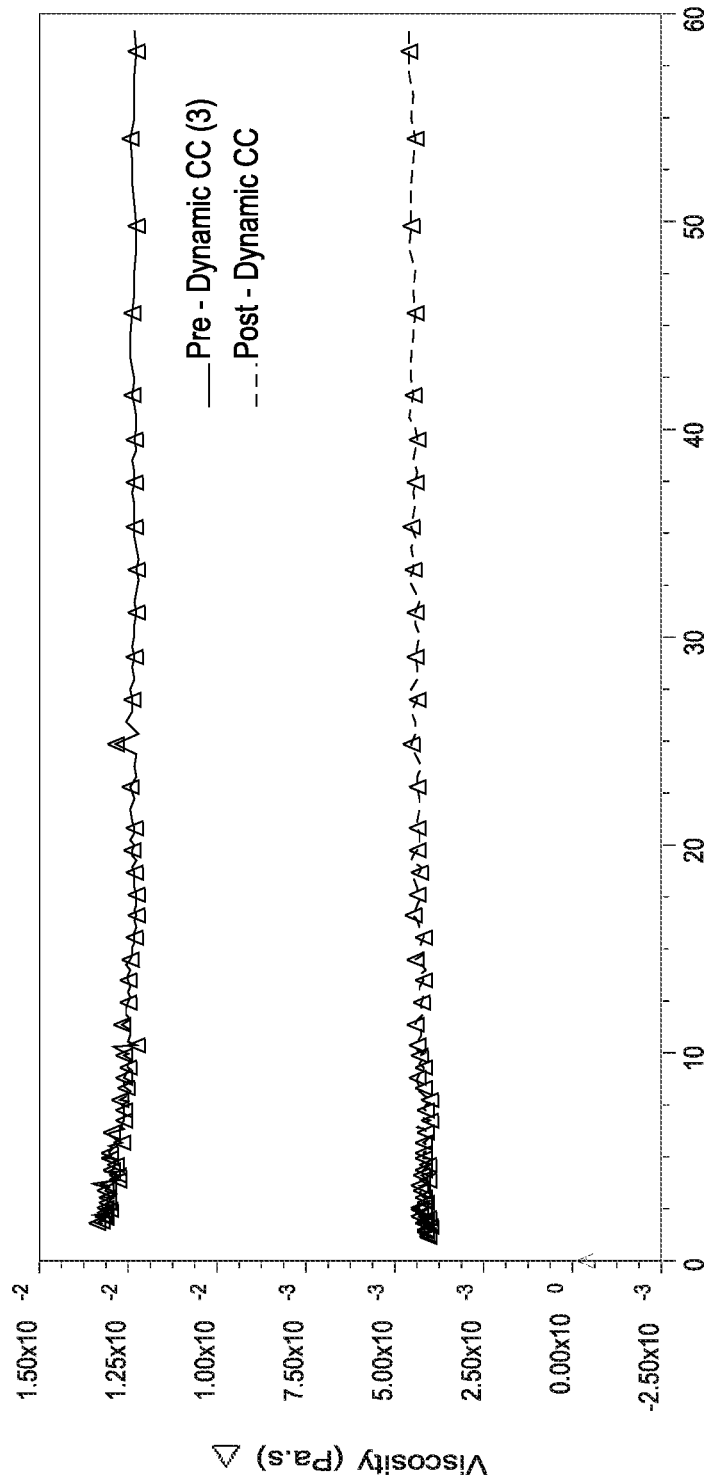

The graph depicted in FIG. 12B shows dynamic viscosities as a function of time collected under oscillatory conditions and takes into account any buildup of fluid structure over time. Post treated oil had a viscosity 6× lower than pre-treated oil.

What is claimed is:

1. A method of converting at least one crystal form in an oil system, the method comprising:
   filtering an electromagnetic radiation through a band-pass filter to obtain at least one spectral energy pattern, wherein the band-pass filter comprises an aluminum alloy comprising:
   aluminum;
   at least one transition metal;
   at least one secondary metal selected from the group consisting of Be, Mg, Ca, Sr, Ba, and Ra; and
   at least one non-metal;
   wherein a combined amount of the at least one transition metal, the at least one secondary metal, and the at least one non-metal is from 5 to 20 wt. % by weight of the aluminum alloy; and
   targeting at least one element or compound, selected from paraffin, asphaltene, and a combination thereof, having a first crystal form in the oil system with the at least one spectral energy pattern to cause conversion of the first crystal form of the at least one element or compound to a second crystal form, wherein the targeting lowers an interfacial tension of the oil system by 5% to 10% and increases a flow of the oil system by at least two-fold as compared to a flow of the oil system without the targeting.

2. The method of claim 1, wherein the at least one spectral energy pattern has a frequency selected from near-infrared frequency, mid-infrared frequency, resonant frequency, and a combination thereof.

3. The method of claim 1, wherein the second crystal form is thermodynamically more stable than the first crystal form.

4. The method of claim 1, wherein the oil system further comprises at least one solvent.

5. The method of claim 4, wherein the at least one solvent comprises water.

6. The method of claim 4, wherein the at least one solvent is non-polar.

7. The method of claim 1, wherein the non-metal is present in an amount of at least 7 wt. % by weight of the aluminum alloy.

8. The method of claim 1, wherein the aluminum alloy comprises:
   7.5-8.0 wt. % Si;
   1.0-2.0 wt. % Cu;
   0.2-0.6 wt. % Mn;
   up to 0.8 wt. % Fe;
   up to 0.35 wt. % Cr;
   up to 0.25 wt. % Ni;
   up to 1.75 wt. % Zn; and
   up to 0.25 wt. % Ti.

9. The method of claim 1, wherein the aluminum alloy comprises 0.2 to 0.6 wt. % Mg.

* * * * *